(12) United States Patent
Azar et al.

(10) Patent No.: US 9,779,503 B2
(45) Date of Patent: Oct. 3, 2017

(54) METHODS FOR MEASURING THE EFFICACY OF A STAIN/TISSUE COMBINATION FOR HISTOLOGICAL TISSUE IMAGE DATA

(71) Applicants: CADESS Medical AB, Uppsala (SE); Christer Busch, Uppsala (SE)

(72) Inventors: Jimmy C. Azar, Uppsala (SE); Christer Busch, Uppsala (SE); Ingrid B. Carlbom, Uppsala (SE); Milan Gavrilovic, Uppsala (SE)

(73) Assignee: CADESS MEDICAL AB, Uppsala (SE)

( * ) Notice: Subject to any disclaimer, the term of this patent is extended or adjusted under 35 U.S.C. 154(b) by 0 days.

(21) Appl. No.: 15/444,941

(22) Filed: Feb. 28, 2017

(65) Prior Publication Data
US 2017/0169568 A1 Jun. 15, 2017

Related U.S. Application Data

(63) Continuation of application No. 14/356,661, filed as application No. PCT/US2012/064282 on Nov. 9, 2012, now Pat. No. 9,607,374.
(Continued)

(51) Int. Cl.
G06K 9/00 (2006.01)
G06T 7/00 (2017.01)
G06T 7/90 (2017.01)

(52) U.S. Cl.
CPC .......... *G06T 7/0012* (2013.01); *G06K 9/0014* (2013.01); *G06T 7/90* (2017.01);
(Continued)

(58) Field of Classification Search
None
See application file for complete search history.

(56) References Cited

U.S. PATENT DOCUMENTS 8,492,156 B2 * 7/2013 Marcelpoil .............. G01N 1/30
382/128
2007/0135999 A1 6/2007 Kolatt
(Continued)

OTHER PUBLICATIONS

M. Uhlen, P. Oksvold, L. Fagerberg, E. Lundberg, K. Jonasson, M. Forsberg, M. Zwahlen, C. Kampf, K. Wester, H. Wernerus, L. Bjorling, and F Ponten, "Towards a knowledge-based Human Protein Atlas," Nature Biotech., vol. 28, pp. 1248-1250 (2010).
(Continued)

*Primary Examiner* — Soo Park
(74) *Attorney, Agent, or Firm* — Porter Wright Morris & Arthur LLP

(57) ABSTRACT

A method measures the efficacy of a stain/tissue combination for histological tissue image data comprising a set of pixels. The measures of efficacy comprise a statistical measure of clustering performance of the different stain/tissue combinations in the Maxwellian Chromaticity plane, and a representative density of the stain/tissue combinations in the density maps. The method captures histological tissue image data using a light absorbent stain; transforms the histological tissue image data to optical density data; projects the optical density data to the Maxwellian Chromaticity plane; identifies at least one reference color using a statistical technique; inverts the reference color to form a color mixing matrix; derives a density map; derives a statistical measure for the clustering performance of the different stain/tissue combinations in the Maxwellian Chromaticity plane; and finds a representative density of the stain/tissue combinations in the density maps.

8 Claims, 15 Drawing Sheets

Related U.S. Application Data

(60) Provisional application No. 61/557,959, filed on Nov. 10, 2011.

(52) U.S. Cl.
CPC ............... *G06T 2207/10024* (2013.01); *G06T 2207/10056* (2013.01); *G06T 2207/30024* (2013.01)

(56) References Cited

U.S. PATENT DOCUMENTS

| | | |
|---|---|---|
| 2008/0253445 A1 | 10/2008 | Hekstra et al. |
| 2010/0081928 A1 | 4/2010 | Hyde et al. |
| 2010/0111396 A1 | 5/2010 | Boucheron |
| 2012/0112098 A1 | 5/2012 | Hoyt |

OTHER PUBLICATIONS

Y. Garini, I.T. Young, and G. McNamara, "Spectral Imaging: Principles and Applications," Cytometry Part A., vol. 69A, pp. 735-747 (Aug. 2006).
N. Keshava, and J.F. Mustard, "Spectral unmixing," IEEE Signal Processing Magazine, vol. 19, pp. 44-57 (Jan. 2002).
R.M. Levenson, "Spectral Imaging Perspective on Cytomics ," Cytometry Part A., vol. 69A, pp. 592-600 (Jul. 2006).
L.E. Boucheron, Z. Bil, N.R. Harvey, B. Manjunath, and D.L. Rimm, "Utility of Multispectral Imaging for Nuclear Classification of Routine Clinical Histopathology Imagery," BMC Cell Biology, BioMed Central, vol. 8, Suppl 1:S8 (Jul. 2007).
Q. Wu, F. Merchant, and K. Castleman, "Microscope Image Processing", Academic Press, pp. 251-253 and 306-319 (2008).
H. Lehr, CM. Van der Loos, P. Teeling, and A.M. Gown, "Complete Chromogen Separation and Analysis in Double Immunohistochemical Stains Using Photoshop-based Image Analysis," J. Histochem. Cytochem., vol. 47, No. 1, pp. 119-125 (Jan. 1999).
K. Nguyen, A.K. Jain, and R.L. Allen, "Automated Gland Segmentation and Classification for Gleason Grading of Prostate Tissue Images," in Proc. International Conference on Pattern Recognition (ICPR), pp. 1497-1500 (2010).
A. Janowczyk, S. Chandran, R. Singh, D. Sasaroli, G. Coukos, M.D. Feldman, and A. Madabhushi, "Hierarchical Normalized Cuts: Unsupervised Segmentation of Vascular Biomarkers from Ovarian Cancer Tissue Microarrays ," Med. Image Comput. Assist. Interv., vol. 12, No. 1, pp. 230-238 (2009).
A.C. Ruifrok, and D.A. Johnston, "Quantification of Histochemical Staining by Color Deconvolution," Anal Quant. Cytol. Histol., vol. 23, No. 4, pp. 291-299 (Aug. 2001).
K.R. Castleman, "Concepts in Imaging and Microscopy: Color Image Processing for Microscopy," Biol. Bull., vol. 194, pp. 100-107 (Apr. 1998).
A. Rabinovich, S. Agarwal, C. Laris, J.H. Price, and S. Belongie, "Unsupervised Color Decomposition of Histologically Stained Tissue Samples," in Proc. Adv. Neur. Info. Process. Syst. (NIPS), pp. 667-674 (2003).
G. Begelman, M. Zibulevsky, E. Rivlin, and T. Kolatt, "Blind Decomposition of Transmission Light Microscopic Hyperspectral Cube Using Sparse Representation," IEEE Trans. Med. Imag., vol. 28, No. 8, pp. 1317-1324 (Aug. 2009).
J. Newberg, and R.F. Murphy, "A Framework for the Automated Analysis of Subcellular Patterns in Human Protein Atlas Images ," J. Proteome Res., vol. 7, No. 6, pp. 2300-2308 (Jun. 2008).
A. Tabesh, and M. Teverovskiy, "Tumor Classification in Histological Images of Prostate Using Color Texture," in Signals, Systems and Computers (ACSSC), pp. 841-845 (2006).
H. Choi, K. R. Castleman, and A. C. Bovik, "Color Compensation of Multicolor FISH Images," in IEEE Trans. Med. Imag., vol. 28, No. 1, pp. 129-136 (2009).
FA. Kruse, A.B. Lefkoff, J.W. Boardman, K.B. Heidebrecht, A.T. Shapiro, P.J. Barloon, and A.F.H. Goetz, "The Spectral Image Processing System (SIPS)—Interactive Visualization and Analysis of Imaging Spectrometer Data," Remote Sensing of Environment, vol. 44, No. 2-3, pp. 145-163 (Aug. 1993).
M. Gavrilovic and C. Wahlby, "Quantification of Colocalization and Cross-Talk Based on Spectral Angles," J. Microscopy, vol. 234, No. 3, pp. 311-324 (Jun. 2009).
A. Koschan and M. Abidi, "Digital Color Image Processing", John Wiley & Sons, pp. 37-41 (2008).
W.W. Parson, "Modern Optical Spectroscopy". Springer, pp. 1-27 (2009).
C.M. van der Loos, "Multiple Immunoenzyme Staining: Methods and Visualizations for the Observation With Spectral Imaging", J. Histochem. Cytochem., vol. 56, No. 4, pp. 313-328 (Apr. 2008).
J.C. Mllikin, L.J. van Vliet, H. Netten, F.R. Boddeke, G. van der Feltz, and I.T. Young, "Methods for CCD Camera Characterization", in Proc. SPIE Image Acquis. Sci. Imaging Syst., vol. 2173, pp. 73-84 (1994).
G. Polder, G. W. A. M. van der Heijden, "Calibration and Characterization of Spectral Imaging Systems", in Proc. SPIE Multisp. Hypersp. Image Acquis., vol. 4548, pp. 10-17 (2001).
J. C. Maxwell, "On the Theory of Compound Colours, and the Relations of the Colours of the Spectrum", Phil. Trans. R. Soc. Lond., vol. 150, pp. 57-84 (Jan. 1860).
D.E. Judd, "A Maxwell Triangle Yielding Uniform Chromaticity Scales", JOSA, vol. 25, Issue 1, pp. 24-35 (1935).
J. Foley, A. van Dam, S. Feiner, J. Hughes, "Computer Graphics: Principles and Practice", pp. 252-259, Addison-Wesley, Reading, MA (1992).
Ilhow et al, "Adaptive color spaces based on multivariate Gaussian distributions for color image segmentation", 2006.

\* cited by examiner

METHODS FOR MEASURING THE EFFICACY OF A STAIN/TISSUE COMBINATION FOR HISTOLOGICAL TISSUE IMAGE DATA

TECHNICAL FIELD OF INVENTION

The present invention relates to the decomposition of images of histological tissue into density maps, where each density map corresponds to the portion of the original histological tissue image data that contains one stain/tissue combination.

BACKGROUND OF THE INVENTION

Pathologists examine tissue under a microscope to discern if there are any deviations from normal that indicate injury or disease. This practice is prone to subjectivity, resulting in significant variations between experienced pathologists. But quantitative tissue analysis based on automated image analysis has the potential to reduce or eliminate subjectivity, yielding a more objective basis for diagnosis and a course of treatment. Quantitative tissue analysis also has a large potential role in research, allowing for rapid and automated processing of large amounts of histopathological data, as is required by for example the Human Protein Atlas Project [1].

Pathologists rely on multiple, contrasting stains for tissue analysis. For example hematoxylin, which stains cell nuclei blue, is usually combined with the counter-stain eosin to stain cytoplasm pink and stromal components in various grades of red/pink, providing local color-contrast. But while pathologists can effectively use color in combination with texture and morphological features for visual analysis, automated tissue recognition based on color is fraught with problems. First, there can be large inter- and intra-specimen variations in stain intensity due to tissue preparation factors, including variations in stain concentration, staining duration, tissue thickness, and in fixation. In order to use color as a basis for diagnosis, it is essential that tissue classification be based only on the tissue absorption characteristics for a specific stain without the influence of variations that are introduced in specimen preparation [2].

A second set of problems is the result of aliasing in the image acquisition process, both in the spectral and spatial domains. Different stains may have overlapping absorption spectra, requiring a method that classifies portions of pixels into the correct stain/tissue combinations. Instead of classifying a pixel with two or more stain/tissue combinations as one of the combinations (binary classification), soft classification rules separate the relative contributions of the stain in each pixel yielding a more accurate classification into density maps. Similarly, aliasing due to limited spatial resolution or tissue thickness may result in multiple tissue components, e.g., cell nuclei and cytoplasm, to be collocated within a single pixel. Again, for a more accurate classification, the relative contributions of each stain/tissue combination within pixels must be separated.

A third problem is the result of the photon noise at image acquisition. Standard three-channel CCD sensors have a linear response to the number of incident photons and the dominant noise is Poisson distributed photon noise. Introduction of noise modeling into the decomposition increases the accuracy of the results.

Color decomposition is a technique developed in fluorescence microscopy based on ideas from remote sensing. Keshava and Mustard [3] describe spectral unmixing as a procedure requiring determination of reference spectra, or colors, and decomposition, i.e., the extraction of a set of gray-level images showing individual contributions of the pixels to each spectral band.

While multispectral solutions offer the advantage that filters may be matched to several stains [4], multispectral imaging is more costly and more time consuming than three-channel imaging, where three channel imaging generally refers to red-green-blue imaging, or RGB imaging. Furthermore Boucheron et al. show that multi-spectral imaging gives only a statistically insignificant increase in performance in histological image analysis [5].

Color decomposition methods in the literature differ in terms of the reference color determination and the algorithm for the actual decomposition of the original image into density maps [6]. Some methods determine the reference color in a color space, while others model light absorption and thus need to model light scattering stains separately. Some reference color determination methods may require user input, while others are completely automated. Decomposition may be implemented either through binary or soft pixel classification. With linear decomposition, a soft pixel classification technique based on the linear mixture model, it is possible to estimate the density information on a subpixel level. Finally, only some methods handle linearly dependent color signatures.

Reference color determination in histological applications often relies on clustering techniques implemented directly in color space, without any consideration for stain/tissue interactions or properties of the sensors. Such methods [7, 8, 9] result only in binary classification which in general leads to loss of information [10].

Color deconvolution [10] is a decomposition method for transmission bright-field microscopy similar to Castleman's color compensation used in fluorescence microscopy [11]. In color deconvolution the user manually selects regions in a training image for each stain/tissue combination. This is followed by a transformation of the data by Beer-Lambert's law and a computation of normalized average red-green-blue values for each selected stain/tissue combination. These normalized color vectors are then used to build a mixing matrix for the decomposition of the histological tissue image data into density maps, one for each stain/tissue combination.

Blind methods, borrowed from remote sensing, for determining stain/tissue combination reference colors, are based on non-negative matrix factorization (NMF), independent component analysis (ICA), or principal component analysis (PCA). The purpose of these methods is to derive a mixing matrix for multispectral analysis [6, 12]. Recently Begelman et al. [13] showed excellent results for hyperspectral data using sparse component analysis. Nevertheless, only NMF [14] and PCA [15] have been tested using three-color image data.

Following decomposition, soft pixel classification is often implemented as a matrix multiplication by the pseudo inverse of the mixing matrix [3, 10, 14, and 16]. Therefore, the method requires all reference colors of the identified stain/tissue combinations to yield well-conditioned mixing matrices.

Spectral angle mapping [2, 17, and 18] offers a stable solution even when the mixing matrix is medially-conditioned and allows for a greater number of stain/tissue combinations than color channels. However, the output images of spectral angle mapping are binary, that is the mapping does not use linear decomposition but rather nearest neighbor pixel classification by spectral angles.

SUMMARY OF THE INVENTION

The method according to the invention generates a blind color decomposition of histological tissue image data into density maps, where each density map corresponds to the portion of the original histological tissue image data that contains one stain/tissue combination. A microscope captures histological tissue image data from a tissue sample that is stained with at least one stain. The method transforms the histological tissue image data into optical density data utilizing the Beer-Lambert law of absorption, and then projects, using a perspective projection, the optical density data to the Maxwellian Chromaticity plane such that the pure subtractive primary colors in the original histological tissue image data determine the vertices of the Maxwellian color triangle in the Maxwellian Chromaticity plane, and where the achromatic data in the histological tissue image data project to the Maxwellian color triangle circumcenter, and where the result is a pure color data representation that is decoupled from the intensity in the optical density data. At least one reference color in the pure color data representation in the Maxwellian Chromaticity plane is derived using a statistical technique, preferably a technique of expectation maximization. The method proceeds to invert at least one of said reference colors to form a color mixing matrix with the columns of the matrix being the inverted color reference vector or vectors, the inversion being the inverse of the projection to the Maxwellian Chromaticity plane. The final density map or density maps are, when the mixing matrix is well-conditioned, derived by applying a pseudo-inverse of the mixing matrix to the optical density data, and when the mixing matrix is medially-conditioned, by applying a piece-wise pseudo-inverse of the mixing matrix to the optical density data. This utilization of a piece-wise pseudo-inverse of the mixing matrix when the mixing matrix is medially-conditioned may be utilized by other color decomposition methods. The method may optionally model the sensor noise in the microscope sensor from the microscope dark frame and blank image, and then use this modeled sensor noise to smooth the histological tissue image data, assuming a Poisson distribution of the noise, prior to the transformation by the Beer-Lambert law. The method of this invention assumes that the areas of histological tissue image data that are affected by the light scattering are removed, preferably using image segmentation techniques, prior to decomposition. The removal of areas stained with a light scattering stain can be used with other existing techniques for color decomposition of histological tissue image data. The method of this invention may also be used to evaluate the efficacy of stain/tissue combinations for histological tissue image data, where the measures of efficacy comprise a statistical measure of the clustering performance of the different stain/tissue combinations in the Maxwellian Chromaticity plane, and a representative density of the stain/tissue combinations in the density maps.

In contrast to the methods in the literature, the method according to this invention fulfills all important requirements for color decomposition of histological tissue image data: (1) it is blind, i.e., it does not require input by the user in the form of training sets or special specimens to extract information prior to processing (2) it relies on a physical model for light absorption; (3) it treats light scattering stains separately as these stains do not obey Beer-Lambert law. The method according to the invention results in density maps, both for well-conditioned and medially-conditioned cases. These density maps can be further processed using well-known, grey-level image analysis techniques for extracting features, such as texture, shape, and contrast measures that may form the basis for tissue analysis.

Herein RGB images are utilized for illustration purposes only; the extension to multiple spectra is straightforward.

BRIEF DESCRIPTION OF THE DRAWINGS

Preferred embodiments of the invention are described with reference to the accompanying drawings, wherein.

DETAILED DESCRIPTION OF THE INVENTION

Figure 1:
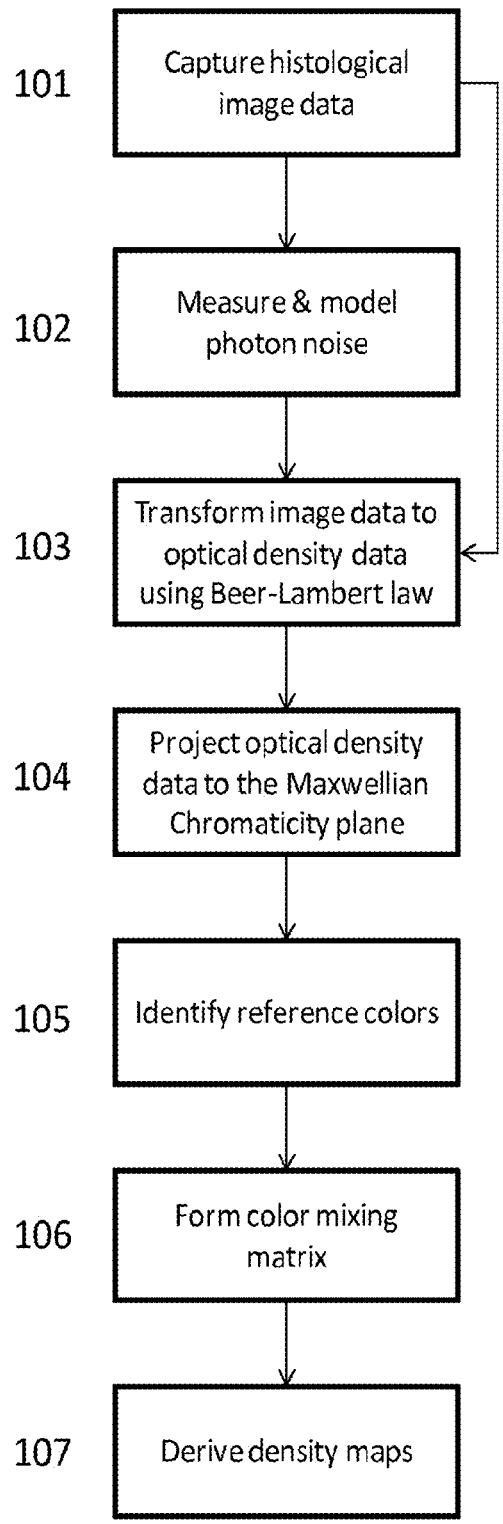
FIG. 1 is a general block diagram representing the process flow from acquisition of histological tissue image data to the generation of density maps according to the present invention.

Referring to FIG. 1, according to the method of the present invention, histological tissue image data, which has been acquired with a microscope from a tissue sample, is decomposed into one or more density maps. A method for generation of density maps comprises the steps of:

101 capturing of histological tissue image data;

102 optional measuring of the microscope photon noise parameters for modeling uncertainty in histological tissue image data;

103 transforming the histological tissue image data to optical density data using the Beer-Lambert law of absorption;

104 projecting of the optical density data to the Maxwellian Chromaticity plane, using a perspective transformation, resulting in pure color data;

105 identifying at least one reference color in the pure color data representation in the Maxwellian Chromaticity plane, using a statistical technique, where said statistical technique is preferably expectation maximization;

106 inverting said reference color to form a color mixing matrix with the columns of the matrix being the inverted color reference vector or vectors, the inversion being the inverse of the projection to the Maxwellian Chromaticity plane;

107 deriving a density map or density maps from the optical density data using the mixing matrix.

Figure 2A:
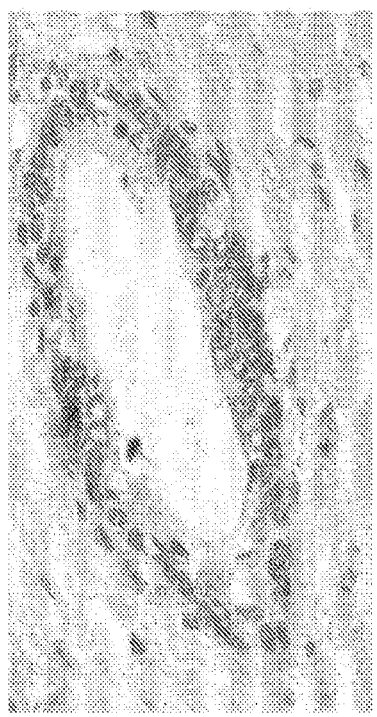
FIG. 2A is an example of histological tissue image data from a tissue sample that was stained with hematoxylin and eosin.
Figure 2B:
FIG. 2B is the density map showing the hematoxylin/tissue combination in the histological tissue image data in FIG. 2A.
Figure 2C:
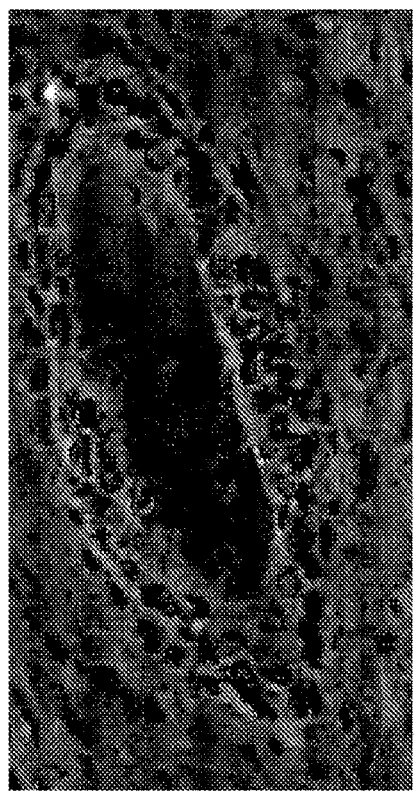
FIG. 2C is the density map showing the eosin/tissue combination in the histological tissue image data in FIG. 2A.

Referring to FIG. 2, according to the present invention, the histological tissue image data in FIG. 2A which has been captured from a tissue sample which is stained with hematoxylin and eosin, is decomposed into two density maps, one for the hematoxylin/tissue combination (FIG. 2B) and one for the eosin/tissue combination (FIG. 2C), in accordance with the method described with reference to FIG. 1.

Figure 3:
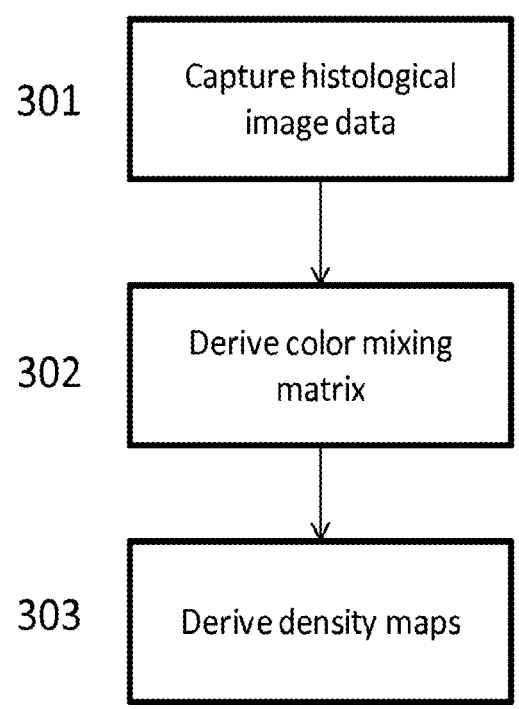
FIG. 3 is a general block diagram representing the process flow according to the present invention.

Referring to FIG. 3, according to the present invention, histological tissue image data, which has been acquired with a microscope from a tissue sample, is decomposed into one or more density maps. A method for the generation of density maps comprises the steps of:

capturing of histological tissue image data from a tissue sample that has been stained with at least one stain, the said stain or stains being light absorbent;

deriving from the histological tissue image data a color mixing matrix with the columns of the matrix being color reference vectors, using any existing method, including but not limited to suitable methods referred to in the introduction, but preferably the method of the present invention;

deriving a density map or density maps from the optical density data using the mixing matrix.

Figure 4:
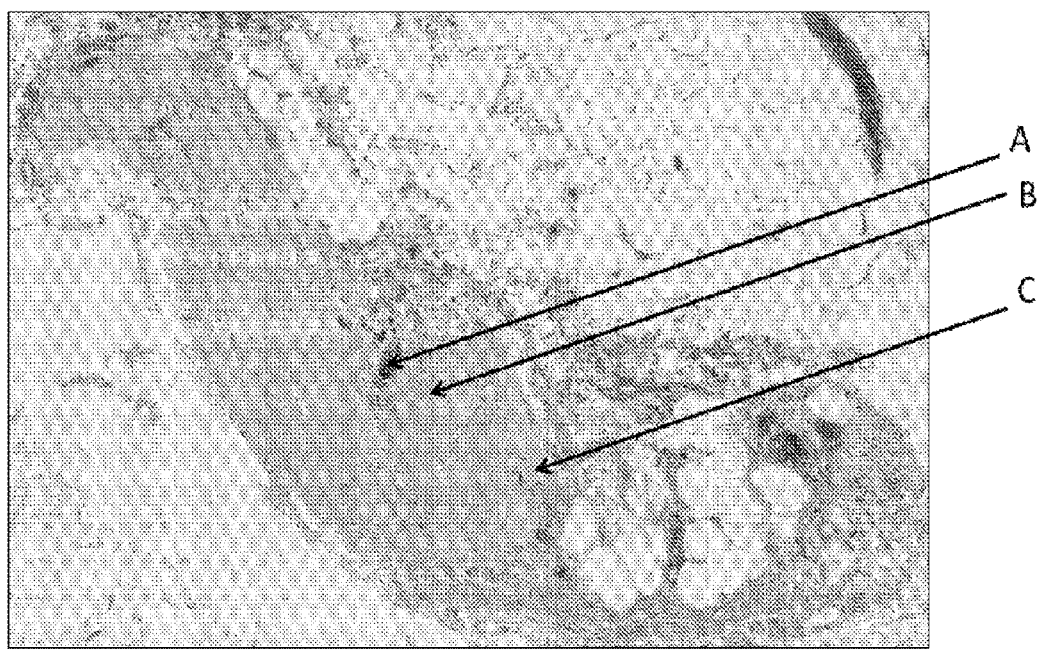
FIG. 4 is an example of histological tissue tri-color image data captured from tissue data with three stain/tissue combinations; stomach tissue sample stained with Gomori trichrome, showing intermyofibrillar muscle membranes (A), cell nuclei (B), and muscle myofibrils (C).

Referring to FIG. 4, according to the present invention, histological tissue tri-color image data has been captured from a tissue sample with three stain/tissue combinations; stomach tissue sample stained with Gomori trichrome, showing intermyofibrillar muscle membranes (A), cell nuclei (B), and muscle myofibrils (C).

Figure 5:
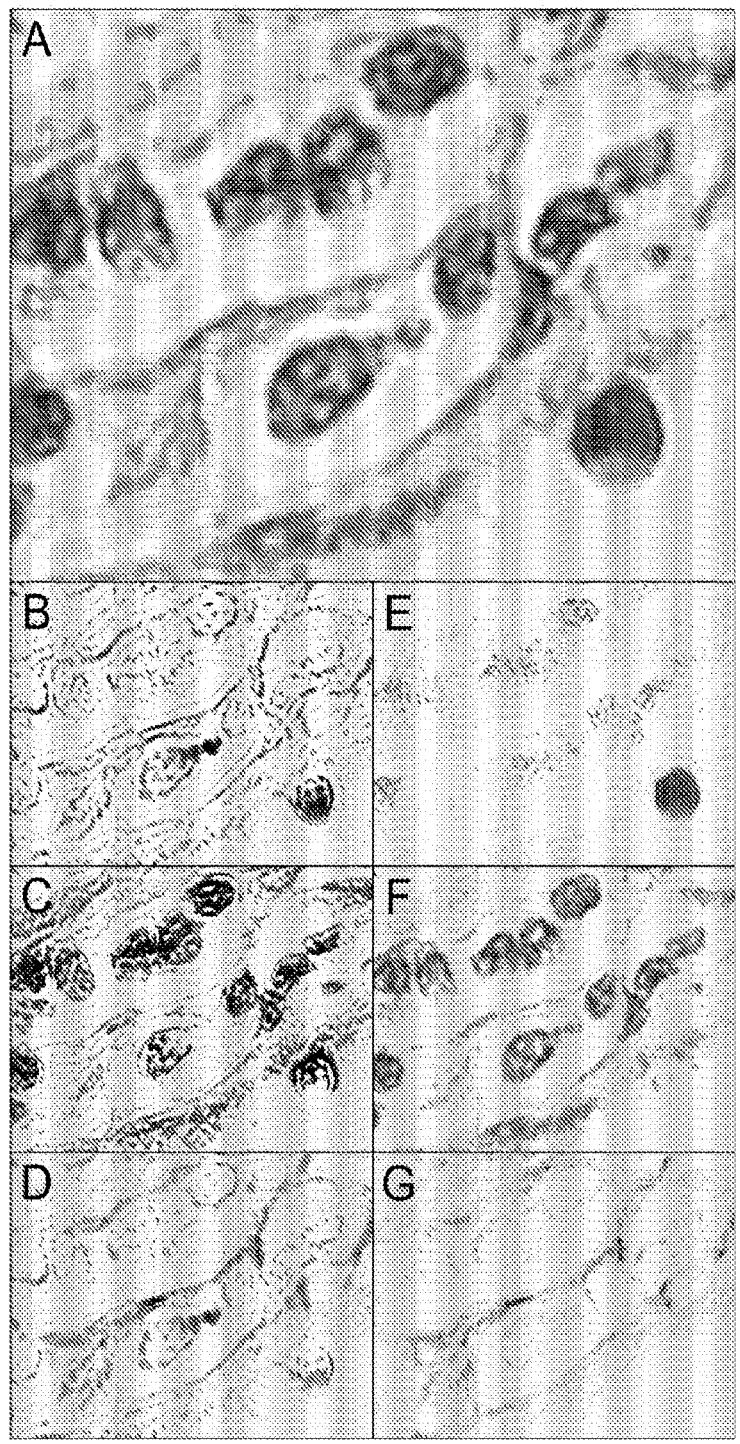
FIG. 5 is a subsection of the histological tissue image data in FIG. 4, with density maps showing the three stain/tissue combinations that are derived using linear decomposition (B, C, D) and piece-wise linear decomposition (E, F, G).

Referring to FIG. 5, according to the present invention, the figure is a subsection of the histological tissue image data in FIG. 4, with density maps for the three stain/tissue combinations that are derived with linear decomposition (B, C, D) and piece-wise linear decomposition (E, F, G).

Figure 6:
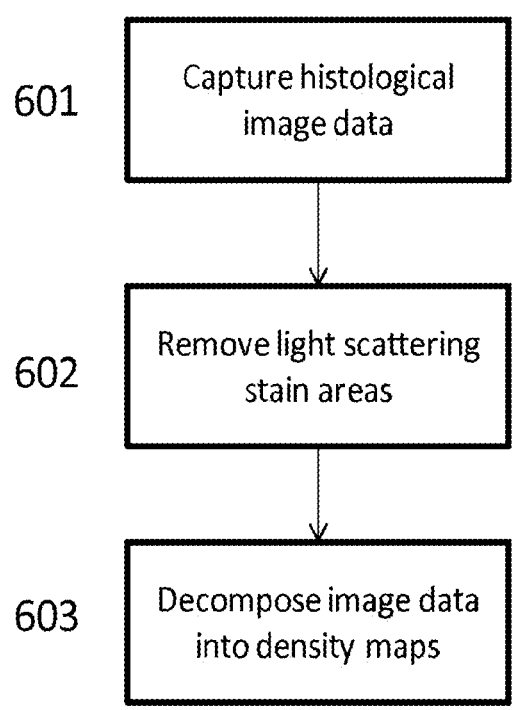
FIG. 6 is a general block diagram representing the process flow from acquisition of histological tissue image data and then the removal of areas with light scattering stain to the generation of density maps according to the present invention.

Referring to FIG. 6, according to the method of the present invention, histological tissue image data, which has been acquired with a microscope from a tissue sample, is decomposed into one or more density maps. A method for generation of density maps comprises the steps of:

capturing of histological tissue image data from a tissue sample that has been stained with at least two stains, wherein at least one said stain is light scattering, and according to one embodiment said stain is a polymer, and at least one said stain is light absorbing;

removal of areas with said light scattering stain from said histological tissue image data yielding histological tissue image data free from light scattering stain, and where said removal preferably uses image segmentation techniques, which includes but is not limited to morphological techniques; and wherein the histological tissue image data free from light scattering stain is decomposed into density maps, using any method, including but not limited to suitable methods referred to in the introduction, but preferably the method of the present invention.

Figure 7A:
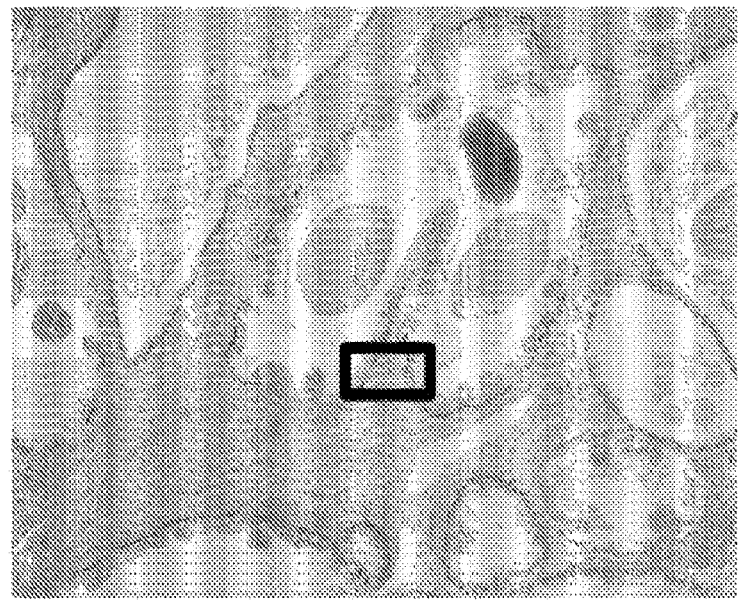
FIG. 7A is prostate tissue image data from a tissue sample stained with hematoxylin (nuclei), saffron (muscle tissue and collagen) and Diaminobenzidine, i.e., DAB (dark basal cells).
Figure 7B:
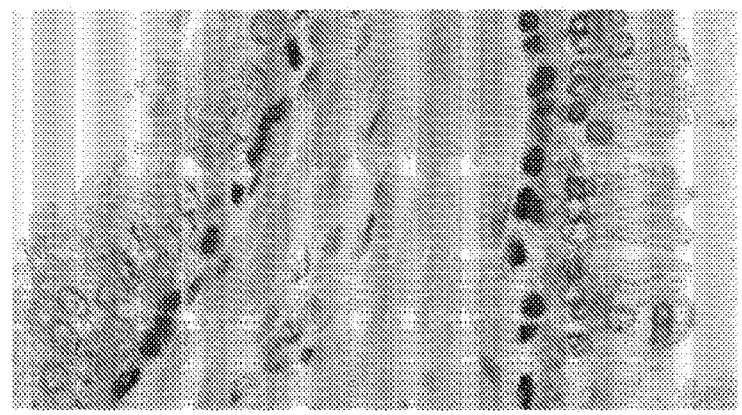
FIG. 7B is a subsection of the prostate tissue image data in FIG. 7A from a tissue sample stained with hematoxylin (nuclei), saffron (muscle tissue and collagen) and DAB (dark basal cells).
Figure 7C:
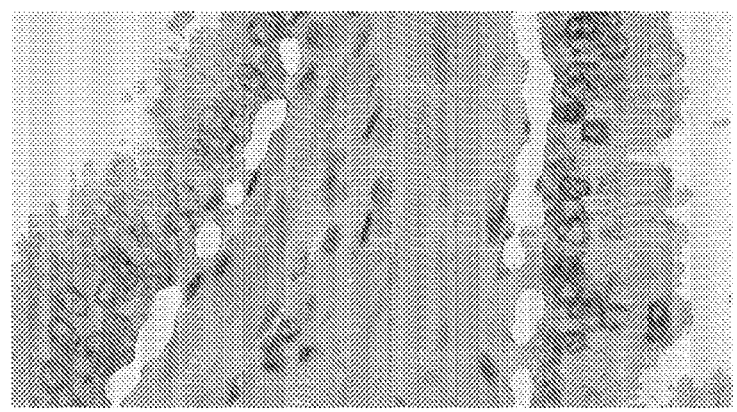
FIG. 7C shows areas affected by the light scattering stain DAB removed in a binary fashion.

Referring to FIG. 7, according to the method of the present invention, FIG. 7A shows prostate histological tissue image data captured from tissue data stained with hematoxylin (nuclei), saffron (muscle tissue and collagen) and DAB (dark basal cells). FIG. 7B is a subsection of the prostate histological tissue image data in FIG. 7A stained with hematoxylin (nuclei), saffron (muscle tissue and collagen) and DAB (dark basal cells). FIG. 7C shows areas affected by the light scattering stain DAB removed using mathematical morphology in accordance to the method described with reference to FIG. 6.

Figure 8:
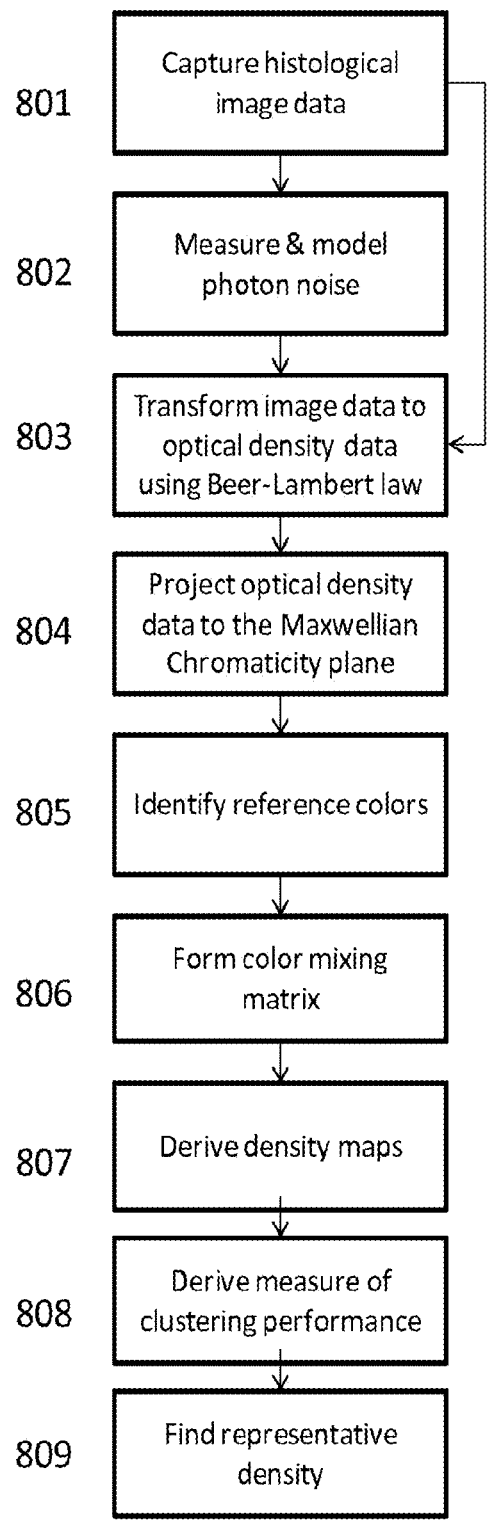
FIG. 8 is a general block diagram representing the process flow from acquisition of histological tissue image data for measuring the efficacy of a stain/tissue combination, where the measures of efficacy comprise a statistical measure of the clustering performance of the different stain/tissue combinations in the Maxwellian Chromaticity plane, and a representative density of the stain/tissue combinations in the density maps, according to the present invention.

Referring to FIG. 8, according to the method of the present invention, histological tissue image data, which has been acquired with a microscope from a stained tissue sample, is used for measuring the efficacy of at least one stain/tissue combination, where the measures of efficacy comprise a statistical measure of the clustering performance, which includes but is not limited to cluster separability of the different stain/tissue combinations in the Maxwellian Chromaticity plane, and a representative density of the stain/tissue combinations in the density maps, the method comprising the steps of:

capturing of histological tissue image data;

optional measuring of the microscope photon noise parameters for modeling uncertainty in histological tissue image data;

transforming the histological tissue image data to optical density data using the Beer-Lambert law of absorption;

projecting of the optical density data to the Maxwellian Chromaticity plane, using a perspective transformation, resulting in pure color data;

identifying at least one reference color in the pure color data representation in the Maxwellian Chromaticity plane, using a statistical technique, where said statistical technique is preferably expectation maximization;

inverting said reference color to form a color mixing matrix with the columns of the matrix being the inverted color reference vector or vectors, the inversion being the inverse of the projection to the Maxwellian Chromaticity plane;

deriving a density map or density maps from the optical density data using the mixing matrix;

deriving a statistical measure of the clustering performance of the different stain/tissue combinations in the Maxwellian Chromaticity plane; and finding a representative density of the stain/tissue combinations in the density maps.

Figure 9:
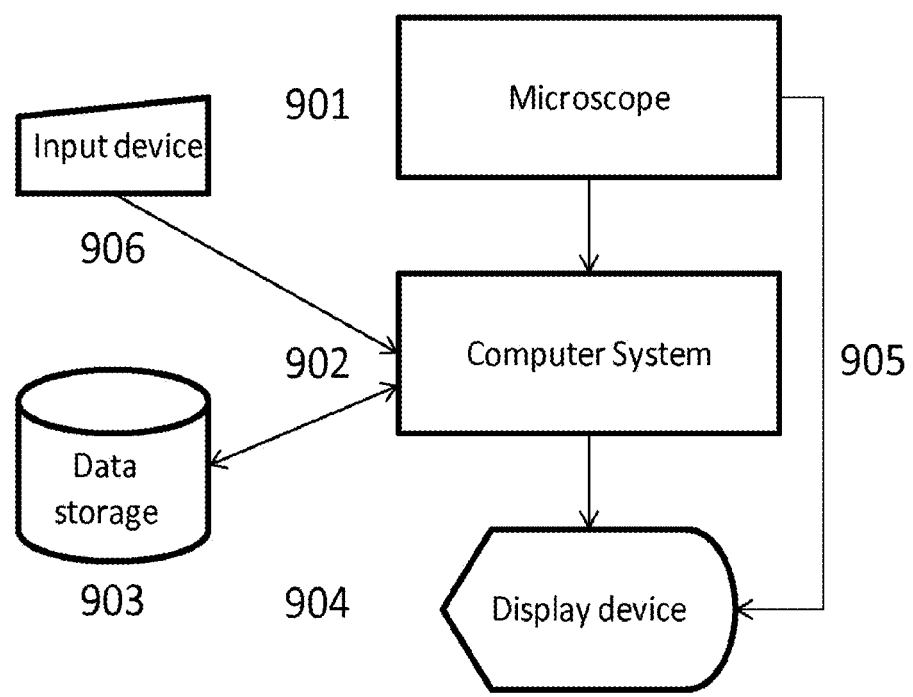
FIG. 9 is a representative system for carrying out the invention.

FIG. 9 illustrates schematically an image capture and analysis apparatus suitable for carrying out the invention. This schematic is for illustration purposes only and those skilled in the art will appreciate that many other system configurations are possible. The image capture and analysis apparatus comprises:

a microscope for capturing histological tissue image data from tissue samples may be a bright-field microscope accompanied by a digital CMOS or CCD camera with objectives that may have, but are not limited to, 4×/0.13, 10×/0.30, and 20×/0.50 objectives. The microscope may be equipped with standard red-green-blue optical filters, but is not limited to these types of filters. For the purpose of this invention, a microscope may also comprise a tissue microarray as input, where up to several hundred sections are stained and imaged simultaneously by a slide scanner. Before processing images from a slide scanner, using the method of the present invention, the tissue sections must be extracted one by one, either manually or automatically, with the aid of a system such as the Aperio ImageScope Software (www.aperio.com). For the purpose of this invention the term microscope includes all devices that may capture tissue samples. The microscope is adapted to capture tissue samples from specimens of any organ system in humans or animals, including but not limited to prostate, breast, kidney, lung, intestines, blood vessels, or nerve tissue. Tissue samples may also include specimens from plants. The method applies to all types of specimens that can be stained and captured with a microscope.

a computer system. Those skilled in the art will appreciate that the invention may be implemented on a variety of computer systems, including personal computers, server computers, main frame computers, and hand-held devices. Furthermore, the invention may be practiced in a networked environment, where the microscope (901) may be located remotely relative to the computer, and where the computer and the microscope are connected over some network, and data storage (903) may be located remotely and accessed over a network.

a display device. The resulting density maps may be viewed on a standard computer monitor and the resulting density maps may be mixed with or overlaid on the original histological tissue image data (905).

an input device utilizing any of a variety of devices, including but not limited to keyboards.

In one embodiment of the invention, the image capture system apparatus is adapted to capturing histological tissue image data from a tissue sample that has been stained with at least one stain, the said stain or stains being light absorbent. In another embodiment of the invention, the image capture apparatus is adapted to capturing histological tissue image data from a tissue sample that has been stained with at least two stains, wherein at least one said stain is light scattering and at least one said stain is light absorbing.

In one embodiment of the invention, the computer system is adapted to the steps of: transforming the histological tissue image data to optical density data, the transformation utilizing the Beer-Lambert law of absorption;

projecting the optical density data to the Maxwellian Chromaticity plane resulting in a pure color data representation that is decoupled from the intensity in the transformed optical density data;

identifying at least one reference color in the pure color data representation in the Maxwellian Chromaticity plane, using a statistical technique;

inverting said reference color to form a color mixing matrix with the columns of the matrix being the inverted color reference vector or vectors, the inversion being the inverse of the projection to the Maxwellian Chromaticity plane;

deriving a density map, when the mixing matrix is well-conditioned, by applying a pseudo-inverse of the mixing matrix to the optical density data; and deriving a density map, when the mixing matrix is medially-conditioned, by applying a piece-wise pseudo-inverse of the mixing matrix to the optical density data.

In another embodiment of the invention, the computer system apparatus is adapted to the steps of:

deriving from the histological tissue image data a color mixing matrix with the columns of the matrix being the color reference vectors;

deriving a density map, when the mixing matrix is well-conditioned, by applying a pseudo-inverse of the mixing matrix to the optical density data; and deriving a density map, when the mixing matrix is medially-conditioned, by applying a piece-wise pseudo-inverse of the mixing matrix to the optical density data.

In another embodiment of the invention, the computer system apparatus is adapted to the steps of:

removal of areas of light scattering stain from the histological tissue image data captured by the microscope from tissue samples stained with at least two stains, wherein at least one said stain is light scattering and at least one said stain is light absorbing, yielding histological tissue image data free from light scattering stain; and wherein the histological tissue image data free from light scattering stain is decomposed into density maps.

Figure 12:
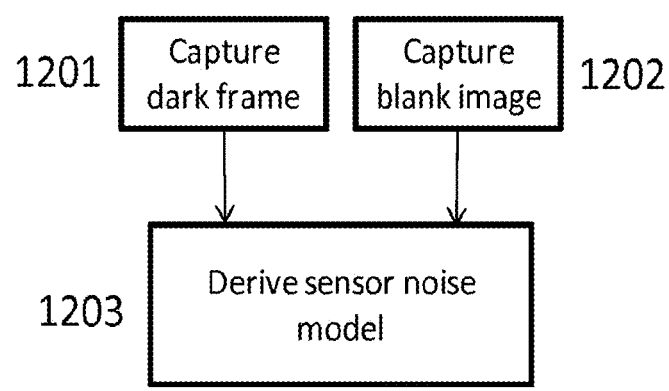
FIG. 12 is a general block diagram representing the process flow from the microscope calibration images to the computation of the standard deviation of the photon noise in the microscope CCD array.

Referring to FIG. 12, according to the method of the present invention, the microscope captures calibration images for computation of the standard deviation of the photon noise in the microscope CCD array, yielding a sensor noise model, the method of the noise derivation comprising the following steps:

1201 capturing a dark frame. For the purpose of this invention, a dark frame is either an image captured off the sensor in the dark, or an image that corresponds to the sensor noise;

1202 capturing of a blank image. For the purpose of this invention, a blank image comprises an image of the illumination source or an image of an area of a specimen where there is no tissue present;

1203 deriving the sensor noise model.

Method for Color Decomposition

Notation c(p) are spatial coordinates in C, the histological tissue image data, and $c(p)=[c_1(p)\ c_2(p)\ c_3(p)]^T$, where $c_1$, $c_2$, and $c_3$, denote the red-green-blue channel values at each pixel.

$a_j$ are the reference color unit vectors for each of the $j=1, \ldots, n$ stain/tissue combinations.

$\hat{d}(p)$ are the estimated relative proportions of the stain/tissue combination for each pixel in the histological tissue image data, $\hat{d}(p)=[\hat{d}_1(p) \ldots \hat{d}_n(p)]^T$. This is the final result: the density map, $\hat{d}_j(p)$, indicates how much of the stain/tissue combination j is present in pixel p in the histological tissue image data.

Note: In this section logarithmic and exponential functions of a vector are applied element-wise.

Image Formation and Linearization by Beer-Lambert Law

Figure 10:
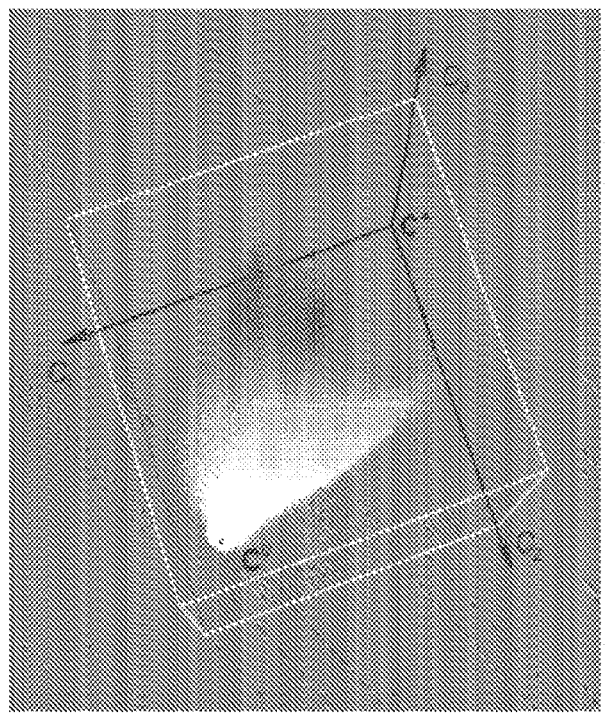
FIG. 10 is an example of a three-dimensional (3D) scatter-plot that helps visualize the three-dimensional distribution of the histological tissue image data in a red-green-blue (RGB) color cube. The figure shows the RGB scatter-plot of the histological tissue image data in FIG. 4.

The light source in a microscope that illuminates a histological sample is denoted $S(\lambda)$, where $\lambda$ is the wavelength. The transfer function for each color channel depends on an optical filter, a sensor with a linear response to the number of incident photons, and a readout circuit. The sensor transfer function is denoted $F(\lambda)=[F_1(\lambda)\ F_2(\lambda)\ F_3(\lambda)]^T$, where $F_1$, $F_2$, and $F_3$ are the transfer functions of the individual red-green-blue color channels, respectively. The spectral distribution of the measured light intensity is represented by the stimulus function $\phi(p,\lambda)$ over wavelengths $\lambda$ ranging from $\lambda_{min}$ to $\lambda_{max}$ [19]. The color distribution for an image (FIG. 4) is often visualized as a 3D scatter plot (FIG. 10). The image color at each pixel in the histological tissue image data, c(p), can be defined by the stimulus function and the transfer function as $$c(p) = \int_{\lambda_{min}}^{\lambda_{max}} \varphi(p, \lambda) F(\lambda) d\lambda. \quad (1)$$

Most stain light absorption follows the Beer-Lambert law that describes the relationship between stain concentration and its absorption [20]. From the Beer-Lambert law it follows that the stimulus function for a sample containing n light-absorbing stain/tissue combinations is $$\varphi(p, \lambda) = S(\lambda) \exp\left(-\sum_{j=1}^{n} A_j(\lambda) d_j(p)\right), \quad (2)$$

where $A_j(\lambda)$ is the absorption spectrum for the stain/tissue combination j, and $d_j(p)$ is the relative proportion of the stain/tissue combination at pixel p.

Figure 11:
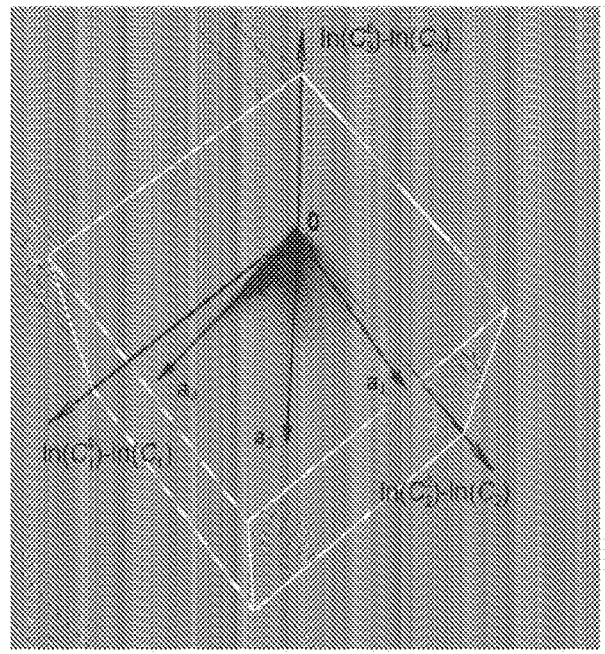
FIG. 11 is an example of a three-dimensional (3D) scatter plot of the optical density data from the histological tissue image data in FIG. 4. Three reference color vectors $a_1$, $a_2$, and $a_3$ are highlighted.

From Equations (1) and (2), the intensities acquired in the individual color channels of c are derived. FIG. 10 shows that the color for each stain/tissue combination, j, is clustered along an arc that starts at one end of the achromatic axis where no light is absorbed, i.e., $d(p^0)=0$, which corresponds to the color of the illumination source and bends to the other end of the achromatic axis where the light source is fully attenuated, i.e., $d_j(p^\infty)\to\infty$, $j=\{1, \ldots, n\}$, which corresponds to $c\infty\to 0$. From the equations above it follows that the optical density can be written in vector form as:

$$\ln(c^0) - \ln(c(p)) = [a_1 \ldots a_n]\hat{d}(p), \quad (3)$$

where each $a_j$ is a unit reference color vector, and $\hat{d}(p)$ is an estimated relative proportion of the stain/tissue combinations. For each stain/tissue combination, the vectors on the left hand side of Equation (3) belong to cone-like volumes centered about the reference color vectors in the 3D scatter plot of the original image data transformed by Beer-Lambert law as seen in FIG. 11.

The objective of the present invention is to find accurate estimated relative proportions of the stain/tissue combinations, $\hat{d}(p)$, without user intervention.

In contrast to supervised methods where an expert, e.g., a pathologist, provides a training set of reference colors or sample regions [5], the method according to this invention is blind, that is it automatically estimates the linear model parameters in Equation (3) from the image data. The method according to this invention requires the following minimal prior knowledge about the tissue sample, (i) the number of light absorbing stain/tissue combinations, n, and (ii) optionally stored dark frame and blank image from the microscope for measuring photon noise, and (iii) information on whether a light scattering stain is present or not.

Image Capture (Steps 101, 301, 601, 801)

In steps 101, 301, 601, 801, the above described image capture system apparatus is used to record the histological tissue image data from a tissue sample stained with one or more stains.

Removal of Light Scattering Stain (Step 602)

This is a step that should be performed when light scattering stain is present in a tissue sample, and can be applied to other existing methods, including but not limited to, suitable methods referred to in the introduction, for color decomposition of histological tissue sample images. The linear mixture model based on the Beer-Lambert law assumes that stains absorb photons from the light source. However polymers, such as Diaminobenzidine (DAB), are commonly used in histology, but they do not obey the Beer-Lambert law [2, 20, 21]. Referring to FIG. 6, the method according to this invention removes pixels that are covered by light scattering stains from the histological input image data prior to decomposition, where the decomposition should be based solely on the light absorbing stains.

The method according to this invention uses a hierarchical clustering technique with complete linkage in the RGB-cube representation of the histological tissue image data [22] to find the pixels therein that are affected by the light scattering stain (see FIG. 7). Assuming that n light absorbing stain/tissue combinations and one light scattering stain are present and that the background appears as white, all data points belonging to the darkest of the n+2 clusters are identified as belonging to the light scattering stain. But light scattering stains have the property that they also affect the neighboring pixels [20]. Therefore, in order to remove all pixels affected by the light scattering stain, the method herein uses mathematical morphology and dilates the light-scattering regions that were identified by the clustering [23]. After the removal of areas influenced by light scattering, the remaining vectors c(p) are treated as light absorbing histological tissue image data.

Noise Measurement and Modeling (Steps 102, 802, and FIG. 12)

This is an optional step that is applied to smooth the histological tissue image data prior to decomposition. Standard three-channel CCD sensors have a linear response to the number of incident photons, and the dominant noise is Poisson distributed photon noise [24, 25]. The photon noise is dominant in the areas around "white" or at low stain concentrations, and therefore the noise tends to smear out over the entire Maxwellian Chromaticity plane, creating spurious peaks. Accurate estimation of the sensor noise parameters smoothes the data and aids in the extraction of color information.

Referring to FIG. 12, the microscope captures a dark frame and a blank image. First, these images are used to automatically set the amplifier gains so that the images are perceived as "white" and "black", respectively. Second, the method of this invention uses as input these images to estimate the photon noise. For each color channel k in the blank image, the method calculates the mean value of the intensities over the image, $c_k^0$, and their standard deviation, $\sigma_k^0$. For the dark frame, the mean value of the measurements is set to be less than one quantization level, that is $c_k^\infty = 0$ [6]. However, due to the amplifier gain, the standard deviation, $\sigma_k^\infty$, is generally not zero and must be estimated from the data.

The standard deviation values $\sigma_k$ over all intensity levels $c_k$ are derived using the linear relationship between the squares of $\sigma_k^\infty$ and $\sigma_k^0$ [24]:

$$\sigma_k = \sqrt{(\sigma_k^\infty)^2 + \frac{(\sigma_k^0)^2 - (\sigma_k^\infty)^2}{c_k^0} c_k}. \qquad (4)$$

Referring to Steps 102 and 802, for each RGB combination in the histological tissue image data, c(p), in the original image, the present invention generates a cloud of D points, $c(p_i)$, i=1, . . . D, centered around each pixel in the histological tissue image data, following a Poisson distribution in three-dimensional color space with the standard deviations $\sigma_k$ as estimated by Equation (4). All points $c(p_i)$ are then transformed via the Beer-Lambert law, resulting in D times greater a number of optical density points. When selecting reference colors, more weight is given to data with high optical density by assigning each point a score given by:

$$u(p_i) = u_0 \max_{k=1,2,3} \{\ln(c_k^0) - \ln(c_k(p_i))\}, \qquad (5)$$

where $u_0$ is a random variable drawn from a distribution as exemplified by a uniform distribution in [0,1], and i=1, . . . , D. Next, in order to reduce the number of data points back to the number of original measurements, 1/D of the points with highest scores are retained. It is important to introduce randomization into the score when weighing the data points as is done in Equation (5). Otherwise considering 1/D of the points with greatest optical density values without first weighing the data points would have the same effect as intensity thresholding and would result in omitting weaker stains such as eosin from the analysis. Experiments indicate that D may preferably lie in the interval (5, 15). The result of the application of the noise data to the histological tissue image data is a smoothed version of the original histological tissue image data.

Application of the Beer-Lambert Law (Steps 103 and 803)

The input to this step is either the original histological tissue image data or such data smoothed by the noise model discussed above. The Beer-Lambert law is applied to the histological tissue image data according to the section on Image Formation and Linearization by Beer-Lambert Law. The output from this step is referred to as the optical density data.

Projection to the Maxwellian Chromaticity Plane (Steps 104 and 804)

The Maxwellian Chromaticity plane has the property that distances between two points in the plane represent the chromaticity differences between the corresponding colors. Furthermore pure RGB colors ($[\ln(c_1^0) 0 0]^T$, $[0 \ln(c_2^0) 0]^T$, and $[0 0 \ln(c_3^0)]^T$) in the optical density data (see FIG. 11) project to vertices of an equilateral triangle[1], the Maxwell color triangle, and points on the achromatic axis in the optical density data (from $p^\infty$ to $p^0$) project to the triangle's circumcenter, at an equal distance from the three pure colors [26, 27].

[1] These colors correspond to cyan, magenta, and yellow in the original histological tissue image data.

The transformation from RGB-space to the Maxwellian Chromaticity plane can be expressed as a perspective transformation with the center of projection at the origin 0 [28] and the projection plane at a distance of $1/\sqrt{3}$ from the origin, yielding the following transformation:

$$\begin{bmatrix} \alpha(p) \\ \beta(p) \end{bmatrix} = \begin{bmatrix} \frac{1}{\sqrt{2}} & -\frac{1}{\sqrt{2}} & 0 \\ -\frac{1}{\sqrt{6}} & -\frac{1}{\sqrt{6}} & \sqrt{\frac{2}{3}} \end{bmatrix} \frac{\ln(c^0) - \ln(c(p))}{\|\ln(c^0) - \ln(c(p))\|_1}, \qquad (6)$$

where $\alpha$ and $\beta$ are coordinates in the Maxwellian Chromaticity plane.

Figure 13:
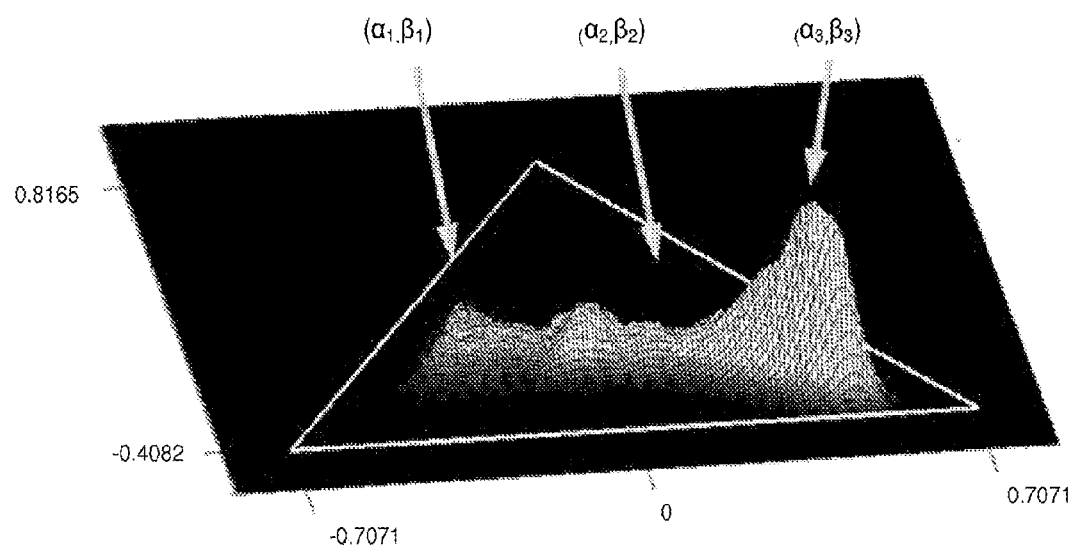
FIG. 13 shows a histogram of the pure color representation of the optical density data after it is projected to the Maxwellian Chromaticity plane.

FIG. 13 shows a histogram over the Maxwellian color triangle, where the height in the histogram indicates the number of color samples in the optical density data at each coordinate in the Maxwellian Chromaticity plane. The cone-like volumes in the scatter plot of the optical density data (see FIG. 11) form clusters in the Maxwellian Chromaticity plane and correspond to distinct peaks in the histogram, with each peak, or cluster, corresponding to one reference color. The output of the projection of the histological tissue image data to the Maxwellian Chromaticity plane is referred to as pure color data.

Identify Reference Colors (Steps 105 and 805)

Figure 14:
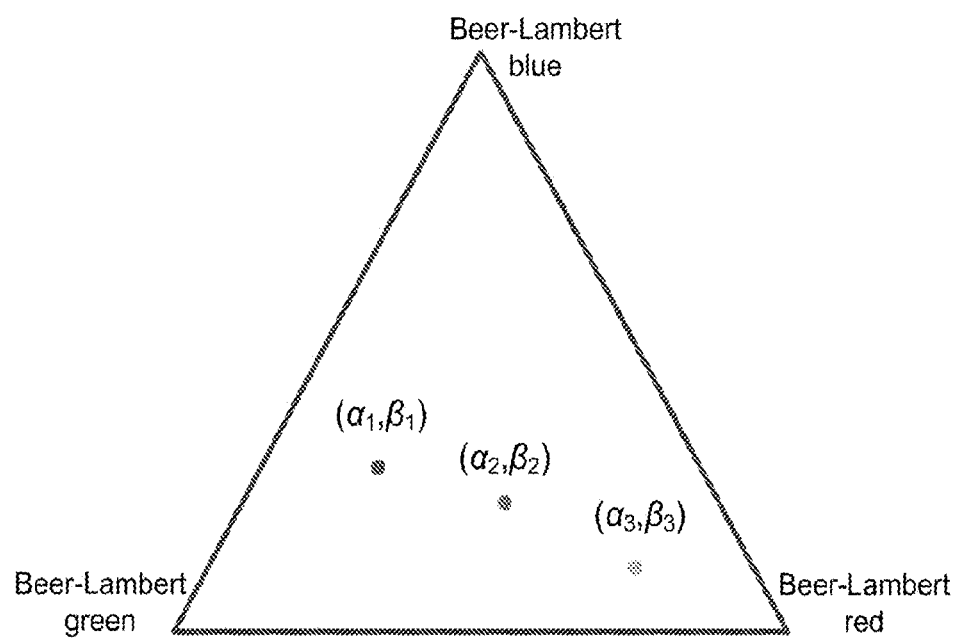
FIG. 14 shows the position of the three reference colors $(\alpha_j, \beta_j)$ in the Maxwellian Chromaticity plane for the histological tissue image data in FIG. 4.

The pure color data form clusters in the Maxwellian Chromaticity plane, with each cluster corresponding to one stain/tissue combination. The centroids of these clusters, $(\alpha_j, \beta_j)$ (see FIG. 13), correspond to the projections of the reference colors $a_j$ in the Maxwellian plane as illustrated in FIG. 14.

A statistical technique, such as expectation maximization including a simple such technique, k-means [22], determines the reference colors $(\alpha_j, \beta_j)$. As a byproduct of this reference color determination, all histological tissue image data are assigned to a cluster, resulting in binary maps.

Form Mixing Matrix (Steps 106 and 806)

In order to obtain a soft classification resulting in density maps, the cluster centroids are employed to find the inverse of the projection defined in Equation (6) and to calculate reference color vectors (note that the reference color vectors are unit vectors in $L_1$ space):

$$a_{j,1} = \sqrt{\frac{1}{2}} \alpha_j - \sqrt{\frac{1}{6}} \beta_j + \frac{1}{3} \qquad (7)$$

$$a_{j,2} = -\sqrt{\frac{1}{2}} \alpha_j - \sqrt{\frac{1}{6}} \beta_j + \frac{1}{3}$$

$$a_{j,3} = 1 - a_{j,1} - a_{j,2}.$$

The reference color vectors, $a_j$ are the columns of the mixing matrix.

Derive Density Maps (Steps 106, 806, and 303)

The method of the present invention finds the relative densities using the mixing matrix by solving the least-squares problem in Equation (3), known as linear decomposition. The pseudo-inverse of the nonnegative mixing matrix $A=[a_1 \ldots a_n]$ is multiplied with the optical density data, yielding the density maps:

$$\hat{d}(p) = (A^T A)^{-1} A^T (\ln(c^0) - \ln(c(p))). \qquad (8)$$

When one of the resulting elements of $\hat{d}(p)$ is less than zero, the element is set to zero and $\hat{d}(p)$ is normalized to one.

This method of inversion assumes that the mixing matrix is well-conditioned. For the purpose of this invention, the mixing matrix is well-conditioned when the color reference vectors are derived from the pure color data clusters that are pair-wise separable in the Maxwellian Chromaticity plane. Stain/tissue combination cluster separability is measured with statistical techniques, said statistical techniques include but are not limited to the Fisher criterion, the Mahalanobis distance [29], and supervised linear classification error [29]. A high value of the Fisher criterion or the Mahalanobis distance, or a low value of the classification error of a statistical linear classifier, corresponds to clusters that are well separated. Lower Fisher criteria and Mahalanobis distances, and similarly larger statistical classification errors, yield worse stain/tissue combination cluster separation; the Fisher criterion may preferably exceed one.

In the case of three stain/tissue combinations, one more condition must be fulfilled for the mixing matrix to be well-conditioned, namely the clusters must be one-against-all separable. This separability is also measured by statistical techniques, including but not limited to the Fisher criterion, the Mahalanobis distance [29], and by supervised linear classification error [29]. In the case when there is only one cluster that has a poor one-against-all separation to other clusters, then the mixing matrix is referred to as medially-conditioned. The centroid of said one cluster that has a poor one-against-all separation to other clusters is referred to as the obtuse reference color and its inverse according to Equation (7) is referred to as the obtuse reference color vector. The remaining two reference colors are referred to as acute reference colors, and the inverses of said acute reference colors are referred to as acute reference color vectors.

When the mixing matrix is medially-conditioned, that is when only one of the clusters has a low one-against-all cluster separation or high statistical linear classification error, the reference color triangle in the Maxwellian Chromaticity plane has an obtuse angle, and the pure color data clusters in the Maxwellian Chromaticity plane overlap in such a fashion that color mixing cannot be separated from pure color. This is the case for the Gomori trichromatic stain shown in FIG. 4, where the reference colors are almost collinear in the Maxwellian Chromaticity plane (see FIG. 13) and the pure color data cluster at $(\alpha_2,\beta_2)$ extends over the line between $(\alpha_1,\beta_1)$, and $(\alpha_3,\beta_3)$.

When only one of the clusters has a low one-against-all cluster separation or high statistical linear classification error, a decomposition is obtained by piece-wise linear decomposition. Piece-wise linear decomposition is implemented by applying a piece-wise pseudo-inverse of the mixing matrix, said piece-wise pseudo inverse comprising two submatrices of the mixing matrix, one submatrix comprising one acute reference color vector (index $j_1$) and the obtuse color reference vector (index $j_2$), and the second submatrix comprising the other acute reference color vector (index $j_3$) and the obtuse color reference vector (index $j_2$). The two submatrices are multiplied with the optical density data and the results are combined to form the density map. With a piece-wise pseudo-inverse, the density map is defined by:

$$\begin{bmatrix} \hat{d}'_{j_2}(p) \\ \hat{d}_{j_1}(p) \end{bmatrix} = ([a_{j_2} a_{j_1}]^T [a_{j_2} a_{j_1}])^{-1} [a_{j_2} a_{j_1}]^T (\ln(c^0) - \ln(c(p))) \qquad (9)$$

$$\begin{bmatrix} \hat{d}''_{j_2}(p) \\ \hat{d}_{j_3}(p) \end{bmatrix} = ([a_{j_2} a_{j_3}]^T [a_{j_2} a_{j_3}])^{-1} [a_{j_2} a_{j_3}]^T (\ln(c^0) - \ln(c(p))),$$

$$\hat{d}_{j_2} = \Im(\hat{d}'_{j_2}(p), \hat{d}''_{j_2}(p))$$

where $\Im$ is a function that determines the third density data element, where the function may select the minimum.

Both the linear decomposition and the piecewise linear decomposition result in soft stain/tissue decomposition.

FIG. 5 shows a comparison of the decomposition of a Gomori trichrome stained tissue sample when using linear and piecewise linear decompositions.

Evaluation of Stains for Color Decomposition (Steps 808 and 809)

Referring to FIG. 8, the method of the present invention may also be used to evaluate stain/tissue combinations. The method proceeds as the method in FIG. 1 above including the derivation of the density maps, and then uses the pure color data in the Maxwellian Chromaticity plane and the density maps to evaluate the efficacy of stain/tissue combinations. FIG. 13 illustrates cloud points or clusters in the Maxwellian Chromaticity plane having Gaussian-like distributions.

One measure of stain/tissue combination efficacy is a measure of clustering performance in the Maxwellian Plane. Statistical techniques for measuring clustering performance include, but are not limited to, the Fisher criterion and the Mahalanobis distance. An alternative measure of stain/tissue combination efficacy is clustering efficacy in terms of the performance of a clustering algorithm as measured against (labeled) ground truth using the Rand index, the F-measure, or other validation measures. As yet an alternative measure of clustering performance, supervised linear classification error may be employed [29].

The optimal stain/tissue combination is that which maximizes the Fisher criterion or the Mahalanobis distance and therefore corresponds to clusters that are as compact and distant apart as possible, or maximizes the Rand index or the F-measure, or other cluster validation measures, or minimizes the statistical classification error.

A second measure of stain efficacy is absorption. With low absorption the density, $\{\ln(c_k^0)-\ln(c_k(p_i))\}$ is dominated by noise. Absorption is measured by a representative value in each density map, where stain is present. One such representative value of the absorption for a stain/tissue combination is the median of the part of the density map where stain is present.

REFERENCES

[1] M. Uhlen, P. Oksvold, L. Fagerberg, E. Lundberg, K. Jonasson, M. Forsberg, M. Zwahlen, C. Kampf, K. Wester, H. Wernerus, L. Björling, and F. Pontén, "Towards a knowledge-based Human Protein Atlas," *Nature Biotech.*, vol. 28, pp. 1248-1250, 2010.

[2] Y. Garini, I. T. Young, and G. McNamara, "Spectral Imaging: Principles and Applications," *Cytometry Part A.*, vol. 69A, pp. 735-747, August 2006.

[3] N. Keshava, and J. F. Mustard, "Spectral unmixing," *IEEE Signal Processing Magazine*, vol. 19, pp. 44-57, January 2002.

[4] R. M. Levenson, "Spectral Imaging Perspective on Cytomics," *Cytometry Part A.*, vol. 69A, pp. 592-600, July 2006.

[5] L. E. Boucheron, Z. Bil, N. R. Harvey, B. Manjunath, and D. L. Rimm, "Utility of Multispectral Imaging for Nuclear Classification of Routine Clinical Histopathology Imagery," *BMC Cell Biology*, BioMed Central, vol. 8, July 2007.

[6] Q. Wu, F. Merchant, and K. Castleman, *Microscope Image Processing*, Academic Press, 2008.

[7] H. Lehr, C. M. Van der Loos, P. Teeling, and A. M. Gown, "Complete Chromogen Separation and Analysis in Double Immunohistochemical Stains Using Photoshop-based Image Analysis," *J. Histochem. Cytochem.*, vol. 47, no. 1, pp. 119-125, January 1999.

[8] K. Nguyen, A. K. Jain, and R. L. Allen, "Automated Gland Segmentation and Classification for Gleason Grading of Prostate Tissue Images," in *Proc. International Conference on Pattern Recognition (ICPR)*, 2010, pp. 1497-1500.

[9] A. Janowczyk, S. Chandran, R. Singh, D. Sasaroli, G. Coukos, M. D. Feldman, and A. Madabhushi, "Hierarchical Normalized Cuts: Unsupervised Segmentation of Vascular Biomarkers from Ovarian Cancer Tissue Microarrays," *Med. Image Comput. Assist. Interv.*, vol. 12, no. 1, pp. 230-238, 2009.

[10] A. C. Ruifrok, and D. A. Johnston, "Quantification of Histochemical Staining by Color Deconvolution," *Anal Quant. Cytol. Histol.*, vol. 23, no. 4, pp. 291-299, August 2001.

[11] K. R. Castleman, "Concepts in Imaging and Microscopy: Color Image Processing for Microscopy," *Biol. Bull.*, vol. 194, pp. 100-107, April 1998.

[12] A. Rabinovich, S. Agarwal, C. Laris, J. H. Price, and S. Belongie, "Unsupervised Color Decomposition of Histologically Stained Tissue Samples," in *Proc. Adv. Neur. Info. Process. Syst. (NIPS)*, 2003, pp. 667-674.

[13] G. Begelman, M. Zibulevsky, E. Rivlin, and T. Kolatt, "Blind Decomposition of Transmission Light Microscopic Hyperspectral Cube Using Sparse Representation," *IEEE Trans. Med. Imag.*, vol. 28, no. 8, August 2009.

[14] J. Newberg, and R. F. Murphy, "A Framework for the Automated Analysis of Subcellular Patterns in Human Protein Atlas Images," *J. Proteome Res.*, vol. 7, no. 6, pp. 2300-2308, June 2008.

[15] A. Tabesh, and M. Teverovskiy, "Tumor Classification in Histological Images of Prostate Using Color Texture," in *Signals, Systems and Computers (ACSSC)*, 2006, pp. 841-845.

[16] H. Choi, K. R. Castleman, and A. C. Bovik, "Color Compensation of Multicolor FISH Images," in *IEEE Trans. Med. Imag.*, 2009, vol. 28, no. 1, pp. 129-136

[17] F. A. Kruse, A. B. Lefkoff, J. W. Boardman, K. B. Heidebrecht, A. T. Shapiro, P. J. Barloon, and A. F. H. Goetz, "The Spectral Image Processing System (SIPS)—Interactive Visualization and Analysis of Imaging Spectrometer Data," *Remote Sensing of Environment*, vol. 44, no. 2-3, pp. 145-163, August 1993.

[18] M. Gavrilovic and C. Wählby, "Quantification of Colocalization and Cross-Talk Based on Spectral Angles," *J. Microscopy*, vol. 234, no. 3, pp. 311-324, June 2009.

[19] A. Koschan and M. Abidi, *Digital Color Image Processing*, John Wiley & Sons, 2008.

[20] W. W. Parson, *Modern Optical Spectroscopy*. Springer, 2009.

[21] C. M. van der Loos, "Multiple Immunoenzyme Staining: Methods and Visualizations for the Observation With Spectral Imaging," *J. Histochem. Cytochem.*, vol. 56, no. 4, pp. 313-328, April 2008.

[22] A. Webb, *Statistical Pattern Recognition*, 2nd ed. Wiley, 2002.

[23] P. Soille, *Morphological Image Analysis, Principles and Applications*, Springer, Berlin, 2004.

[24] J. C. Mullikin, L. J. van Vliet, H. Netten, F. R. Boddeke, G. van der Feltz, and I. T. Young, "Methods for CCD Camera Characterization," in *Proc. SPIE Image Acquis. Sci. Imaging Syst.*, vol. 2173, pp. 73-84, 1994.

[25] G Polder, G W A. M. van der Heijden, "*Calibration and Characterization of Spectral Imaging Systems*," in *Proc. SPIE Multisp. Hypersp. Image Acquis.*, vol. 4548, pp. 10-17, 2001.

[26] J. C. Maxwell, "On the Theory of Compound Colours, and the Relations of the Colours of the Spectrum," *Phil. Trans. R. Soc. Lond.*, vol. 150, pp. 57-84, January 1860.

[27] D. E. Judd, "A Maxwell Triangle Yielding Uniform Chromaticity Scales," *JOSA*, vol. 25, Issue 1, pp. 24-35, 1935.

[28] J. Foley, A. van Dam, S. Feiner, J. Hughes, *Computer Graphics: Principles and Practice*, Addison-Wesley, Reading, Mass., 1992.

[29] R. O. Duda, P. E. Hart, D. G Stork, *Pattern Classification*, $2^{nd}$ ed., John Wiley & Sons, 2001.

What is claimed is:

1. A method for measuring the efficacy of a stain/tissue combination for histological tissue image data, image data comprising a set of pixels, where the measures of efficacy comprise a statistical measure of clustering performance of the different stain/tissue combinations in the Maxwellian Chromaticity plane, and a representative density of the stain/tissue combinations in the density maps, the method comprising the steps of:

capturing of histological tissue image data from a tissue sample that has been stained with at least one stain, the said stain or stains being light absorbent;

transforming the histological tissue image data to optical density data, the transformation utilizing the Beer-Lambert law of absorption;

projecting the optical density data to the Maxwellian Chromaticity plane resulting in a pure color data representation that is decoupled from the intensity in the transformed image data, wherein the pure primary subtractive colors in the histological tissue image data determine the vertices of the Maxwellian color triangle in the Maxwellian Chromaticity plane, and the projection is a perspective projection and the color data along the achromatic axis project to the Maxwellian color triangle circumcenter;

identifying at least one reference color in the pure color data representation in the Maxwellian Chromaticity plane, using a statistical technique;

inverting said reference color to form a color mixing matrix with the columns of the matrix being the inverted color reference vector or vectors, the inversion being the inverse of the projection to the Maxwellian Chromaticity plane;

deriving a density map, when the mixing matrix is well-conditioned, by applying a pseudo-inverse of the mixing matrix to the optical density data;

deriving a density map, when the mixing matrix is medially-conditioned, by applying a piece-wise pseudo-inverse of the mixing matrix to the optical density data;

deriving a statistical measure for the clustering performance of the different stain/tissue combinations in the Maxwellian Chromaticity plane; and finding a representative density of the stain/tissue combinations in the density maps.

2. The method of claim 1, wherein the pure primary subtractive colors in the histological tissue image data determine the vertices of the Maxwellian color triangle in the Maxwellian Chromaticity plane, and the projection is a perspective projection and the color data along the achromatic axis project to the Maxwellian color triangle circumcenter.

3. The method of claim 1, where the statistical techniques employs expectation maximization.

4. The method of claim 1, wherein the sensor noise is modeled for smoothing the histological tissue image data in order to ensure that the sensor noise does not interfere with the statistical clustering, the method comprising the further steps of:
   capturing a dark frame;
   capturing a blank image;
   calculating, for each channel, the mean and standard deviation of the intensities over the dark frame;
   calculating, for each channel, the mean and standard deviation of the intensities over the blank image;
   calculating, for each channel, the standard deviation of all intensity levels; and
   applying the noise to each pixel in the histological tissue image data using a Poisson distribution of the noise.

5. The method of claim 1, wherein the statistical measure of clustering performance of the different stain/tissue combinations in the Maxwellian Chromaticity plane employs the Mahalanobis distance or the Fisher criterion.

6. The method of claim 1, wherein the statistical measure of clustering performance of the different stain/tissue combinations in the Maxwellian Chromaticity plane is based on assessing the performance of unsupervised classification methods with the Rand index or F-measure as measured against (labeled) ground truth.

7. The method of claim 1, wherein the statistical measure of clustering performance of the different stain/tissue combinations in the Maxwellian Chromaticity plane is based on assessing class separability by supervised classification techniques using classification error.

8. The method of claim 1, wherein a representative measure of the stain density is the median of the stain density in the density map, where stain is present.

* * * * *